US009155030B2

(12) United States Patent
Chhabra et al.

(10) Patent No.: US 9,155,030 B2
(45) Date of Patent: Oct. 6, 2015

(54) METHODS AND APPARATUS FOR NETWORK SELECTION IN OVERLAPPING NETWORK ENVIRONMENTS

(71) Applicant: Apple Inc., Cupertino, CA (US)

(72) Inventors: Kapil Chhabra, Cupertino, CA (US); Artiom Shamis, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 53 days.

(21) Appl. No.: 13/929,323

(22) Filed: Jun. 27, 2013

(65) Prior Publication Data

US 2014/0003408 A1 Jan. 2, 2014

Related U.S. Application Data

(60) Provisional application No. 61/665,248, filed on Jun. 27, 2012.

(51) Int. Cl.
*H04W 48/16* (2009.01)
*H04W 72/02* (2009.01)
*H04W 48/18* (2009.01)

(52) U.S. Cl.
CPC .............. *H04W 48/16* (2013.01); *H04W 72/02* (2013.01); *H04W 48/18* (2013.01)

(58) Field of Classification Search
CPC . H04W 56/00; H04W 56/0045; H04W 48/16; H04B 7/2662; H04B 7/2628; H04B 2201/70701; H04B 2201/70702; H04B 2201/70718; H04J 2011/0096; H04J 2011/0003; H04L 12/66; H04L 2012/46; H04L 2012/5618; H04L 12/46

USPC .......................................... 370/252, 310–350
See application file for complete search history.

(56) References Cited

U.S. PATENT DOCUMENTS

| 5,509,051 | A   | * | 4/1996  | Barnett et al. ............... 455/443    |
|-----------|-----|---|---------|-------------------------------------------|
| 8,073,441 | B1  | * | 12/2011 | Unger et al. ............... 455/422.1    |
| 8,787,912 | B2  | * | 7/2014  | Zou ............................... 455/436 |
| 2005/0272425 | A1 | * | 12/2005 | Amerga et al. ............... 455/436   |
| 2007/0211669 | A1 | * | 9/2007  | Umatt et al. ................... 370/335 |
| 2008/0057948 | A1 | * | 3/2008  | Mittal et al. ............... 455/426.1  |
| 2010/0232332 | A1 | * | 9/2010  | Abdel-Kader ............... 370/311      |
| 2010/0250548 | A1 | * | 9/2010  | Kim ............................... 707/741 |
| 2010/0267387 | A1 | * | 10/2010 | Stephens ....................... 455/436  |
| 2011/0110300 | A1 | * | 5/2011  | Sachs et al. ................... 370/328 |
| 2011/0182221 | A1 | * | 7/2011  | Arakawa ....................... 370/311   |
| 2012/0039181 | A1 | * | 2/2012  | Aziz et al. ..................... 370/241 |
| 2012/0225657 | A1 | * | 9/2012  | Watanabe et al. ............. 455/436   |
| 2012/0322447 | A1 | * | 12/2012 | Ramachandran et al. ..... 455/436     |
| 2013/0040697 | A1 | * | 2/2013  | Ekici et al. ................. 455/552.1 |

* cited by examiner

*Primary Examiner* — Warner Wong
(74) *Attorney, Agent, or Firm* — Downey Brand LLP

(57) ABSTRACT

Methods and apparatus for prioritizing network selection for overlapping networks. Overlapping networks include multiple networks with, for instance, different bandwidth limitations. For example, a Wi-Fi Access Point (AP) can broadcast two (2) overlapping networks in the same location: (i) a public network, and (ii) a private network. In one exemplary embodiment, a Wi-Fi client device performs fast scans to quickly locate one or more preferred networks (e.g., the last connected to public network). If the located preferred network is also identified as an overlapping network (e.g., based on location information, etc.), then the client device performs a comprehensive scan to identify all available networks, and applies a prioritization scheme to determine the highest priority network available (e.g., a private network).

20 Claims, 5 Drawing Sheets

METHODS AND APPARATUS FOR NETWORK SELECTION IN OVERLAPPING NETWORK ENVIRONMENTS

PRIORITY AND RELATED APPLICATIONS

This application claims priority to U.S. Provisional Patent Application Ser. No. 61/665,248 filed on Jun. 27, 2012 and entitled "METHODS AND APPARATUS FOR NETWORK SELECTION IN OVERLAPPING NETWORK ENVIRONMENTS", the foregoing being incorporated herein by reference in its entirety.

This application is related to co-owned and co-pending U.S. patent application Ser. No. 12/008,623 filed Jan. 10, 2008 and entitled "APPARATUS AND METHODS FOR NETWORK RESOURCE ALLOCATION", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of Use

The present disclosure relates generally to the field of network selection within wireless networks. More particularly, in one exemplary embodiment, the present disclosure is directed to schemes for selecting and/or prioritizing one network from a number of available networks.

2. Description of Related Technology

Data and communications networks are of increasing importance in modern society. Particularly important are wireless networks, which are characterized generally by: (i) one or more access points or base stations, and (ii) a plurality of users with wireless-enabled devices that can communicate with the access points or base stations.

One wireless network technology of particular interest and ubiquity is so-called "Wi-Fi™" technology. Wi-Fi™ (also "Wifi" or "WiFi") is a wireless local area network (WLAN) technology based on the Institute of Electrical and Electronics Engineers' (IEEE) 802.11 standards. As used herein, the terms "Wi-Fi", "Wifi" and "802.11" refer without limitation to IEEE Stds. 802.11a,b,g,n,s,u,v and/or 802.11-2012. Wi-Fi devices can exchange data over a wireless connection to other Wi-Fi devices (ad hoc peer-to-peer networks), or alternately to a Wi-Fi Access Point (AP) which may connect to an Internet Protocol (IP) Gateway (to access the Internet or other networked devices). They may also be part of so-called "mesh networks" such as those described in 802.11s/u. Generally, a Wi-Fi AP provides a so-called "hotspot" of coverage; hotspots can vary in size greatly e.g., from very localized (e.g., within a residential address, or small business) to multiple square miles (e.g., by coordinating multiple overlapping APs).

Recently, several Network Internet Service Providers (ISPs) have initiated new networking infrastructure models which enable subscribers the option to share their home Wi-Fi hotspot, in exchange for reciprocal coverage outside their home. Existing solutions require that a participating subscriber's home AP will broadcast two (2) overlapping networks in the same location; i.e., (i) a public network, and (ii) a private network. The public network is characterized by a public/open security protocol controlled by the ISP, and a relatively low bandwidth capability. The private network provides a secure, higher bandwidth home network that is administered by the subscriber (or proxy administrator). Ideally, any other "roaming" subscriber can receive roaming access via the public network portion of the participating subscriber's home AP. However, due to bandwidth limitations on the roaming AP's use, the participating home network subscriber is minimally impacted.

Existing network selection techniques are not optimized for overlapping network operation such as that of the exemplary 802.11 context discussed above. Specifically, existing network selection techniques are based on minimizing network search time, and are unsuitable for handling the various complexities introduced by overlapping network operation. Accordingly, improved methods and apparatus for selection of, and operation within, such overlapping networks are needed.

SUMMARY

The present disclosure provides, inter alia, improved apparatus and methods for selecting one network from a number of available networks based on one or more network prioritization schemes.

A method for prioritizing network selection for overlapping wireless networks is disclosed. In one embodiment, the method includes: maintaining a database of overlapping networks; identifying one or more networks; when a first network is identified, the checking an availability of one or more overlapping networks based on the maintained database and the identified first network; when one or more overlapping networks is available, determining a prioritized network; and connecting to the prioritized network.

A mobile apparatus is also disclosed. In one exemplary embodiment, the mobile apparatus includes a wireless modem; a processor in signal communication with the modem; and logic configured to implement prioritized network selection for overlapping networks.

A wireless system is further disclosed. In one embodiment, the system includes at least one wireless access point (AP) and at least one wireless client device. The base station and wireless client device are further configured to implement prioritized network selection for overlapping networks so as to, inter alia, improve wireless client device performance.

A computer readable apparatus is additionally disclosed. In one embodiment, the apparatus includes a storage medium having a computer program disposed thereon, the program configured to, when executed, implement prioritized network selection for overlapping networks.

A wireless access point (AP) apparatus is also disclosed. In one exemplary embodiment, the wireless AP apparatus includes a modem; a processor in signal communication with the modem; and logic configured to implement an overlapping network.

A method for prioritized network selection within overlapping networks is also disclosed. In one embodiment, the method includes: generating a database of Wi-Fi Access Points (APs); performing a limited scan to search for a discovered network, the limited scan including scanning less than all available channels; and when a discovered network is not found during the limited scan, performing a first comprehensive scan, the first comprehensive scan including scanning all available networks. In one variant, the method further includes, when a discovered network is found during the limited scan, determining whether the discovered network is an overlapping network of a plurality of overlapping networks based at least in part on the database, and when the discovered network is not an overlapping network, connecting to the discovered network. In another variant, the method includes, when the discovered network is an overlapping network, performing a second comprehensive scan to search for additional networks, the second comprehensive scan including scanning all available networks; prioritizing any additionally discovered networks and the discovered network; and connecting to a highest priority network.

In one variant, generating the database includes recording the location of each Wi-Fi AP that the client device connects with. In some cases, generating the database further includes categorizing a first Wi-Fi AP as one overlapping network of the plurality of overlapping networks when it is located within a certain proximity to a second Wi-Fi AP, where the certain proximity is determined based on the range of the first Wi-Fi AP. In other cases, generating the database further includes categorizing a first Wi-Fi AP as one overlapping network of the plurality of overlapping networks when the first Wi-Fi AP provides connections to multiple networks.

A method for prioritizing network selection for overlapping networks is further disclosed. In one embodiment, the method includes: identifying one or more networks; for each identified network, checking an availability of one or more overlapping networks based on a maintained database of overlapping networks and the each identified network; when one or more overlapping networks is available, determining a prioritized network; and attempting to connect to the prioritized network.

In one variant, the identifying one or more networks includes scanning a subset of all possible network resources. In one such case, the subset is based on historical usage.

In some cases, the one or more overlapping networks includes at least a first private network.

In some variants, checking the availability of one or more overlapping networks includes scanning a fixed number of times. In another example, checking the availability of one or more overlapping networks includes scanning a dynamic number of iterations based on a remaining battery metric.

In various implementations, when the attempt to connect to the prioritized network fails, the method further includes attempting to connect to the next highest priority network.

An apparatus is also disclosed. In one embodiment, the apparatus includes: a network interface; a processor; and a non-transitory computer readable apparatus having a storage medium with at least one computer program stored thereon. In one exemplary variant, the at least one computer program is configured to, when executed on the processor, cause the apparatus to: identify, via the network interface, at least a first network. When at least the first network is identified, a check of an availability of one or more overlapping networks based on a database of such networks and the identified first network is performed; and when one or more overlapping networks is available, a prioritized network is determined; and the prioritized network connected.

Various implementations may determine the prioritized network dynamically based on: historical preference, prevailing network condition, rate of power consumption, whether an overlapping network of the one or more overlapping networks is private, etc.

In some variants, the at least one computer program is further configured to, when executed on the processor, cause the apparatus to periodically update the database. The updates may originate from e.g., a network-based database.

An apparatus for prioritizing network selection on overlapping networks is further disclosed. In one embodiment, the apparatus includes: a network interface; first logic configured to identify, via the network interface, one or more networks; second logic configured to, when a first network is identified, check an availability of one or more overlapping networks based on a maintained database of overlapping networks and the identified first network; third logic configured to, when one or more overlapping networks is available, determine a prioritized network; and fourth logic configured to connect to the prioritized network.

Other features and advantages of the present disclosure will immediately be recognized by persons of ordinary skill in the art with reference to the attached drawings and detailed description of exemplary embodiments as given below.

Figure 1:
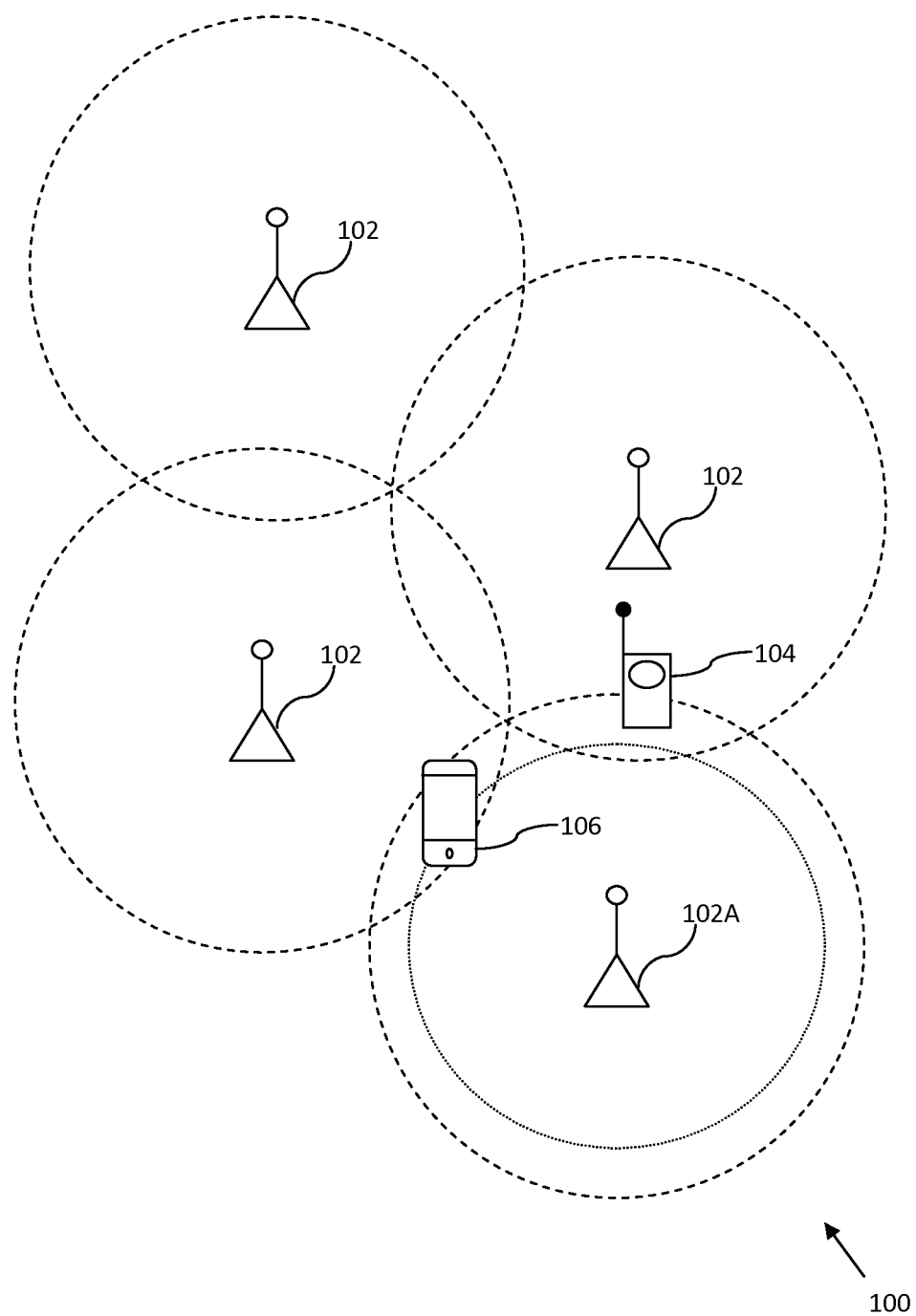
FIG. 1 is a graphical representation of one exemplary overlapping network configuration useful for illustrating one or more embodiments.

All Figures © Copyright 2012-2013 Apple Inc. All rights reserved.

DETAILED DESCRIPTION

Reference is now made to the drawings, wherein like numerals refer to like parts throughout.

Overview

As previously alluded to, existing network selection techniques are not optimized for overlapping network operation. Accordingly, improved methods and apparatus for prioritizing network selection for overlapping networks are disclosed hereinafter. In one exemplary embodiment, a Wi-Fi client device performs network discovery, and additionally identifies if an overlapping network is available based on e.g., location information, etc. If an overlapping network may be available, then the client device performs a comprehensive scan to identify all available networks, and applies a prioritization scheme to determine the highest priority network available.

Since the client device only checks for high priority networks when such a prioritized network is likely to be found, the client device can improve performance significantly without having to continuously scan for prioritized networks.

Various additional optimizations are disclosed. For example, in accordance with one variant, a wireless client device may prioritize overlapping networks according to a static prioritization scheme, or alternately, according to a dynamic prioritization scheme. One exemplary dynamic scheme is configured to adapt to historic usage patterns. For example, if the client device is connected to a first network (e.g., public hotspot) and the user typically selects a second network (e.g., a private network), then the device can store this information to "learn" the user's selection preferences.

DETAILED DESCRIPTION OF EXEMPLARY EMBODIMENTS

Exemplary embodiments are now described in detail. While these embodiments are primarily discussed in the context of an Institute of Electrical and Electronics Engineers' (IEEE) 802.11 standards compliant Wi-Fi system, it will be recognized by those of ordinary skill that the present disclosure is not so limited. In fact, the various embodiments are useful in any wireless network that can benefit from prioritized network selection within overlapping networks as described herein. Other examples of prioritized network selection within overlapping networks include for example, cellular networks, metropolitan area networks (MANs) such as e.g., those based on IEEE Std. 802.16 and its variants (so-called "WiMAX"), etc. Moreover, within various cellular technologies, so-called "femtocells" are a cellular base station purchased by a subscriber. Typically, femtocells are designed for use in a home (or other residence) and/or small business, and may be configured to provide various degrees of network operator and/or subscriber administrative control. Common examples of cellular technologies which offer femtocell operation include, without limitation: Universal Mobile Telecommunications System (UMTS), Wideband Code Division Multiple Access (WCDMA), Global System for Mobile Communications (GSM), CDMA2000, Time Division Synchronous CDMA (TD-SCDMA), and Long Term Evolution (LTE) networks.

As used hereinafter, the term "server" may include, but is not limited to, cellular base stations, macrocells, macrocells, femtocells, picocells, wireless access points (e.g., Wi-Fi "APs"), ad hoc networking devices, network gateways, wireless routers, and any combinations of the foregoing.

As used hereinafter, the term "client device" may include, but is not limited to, cellular telephones, smart phones (such as for example the exemplary iPhone™ device manufactured by the Assignee hereof), personal computers (PCs), such as for example the iMac™, Mac Pro™, Mac Mini™ or MacBook™ devices manufactured by the Assignee hereof, and minicomputers, whether desktop, laptop, or otherwise, as well as mobile computerized devices such as handheld computers, tablet computers (such as for example the exemplary iPad™ device manufactured by the Assignee hereof), PDAs, personal media devices (PMDs)), or any combinations of the foregoing.

As used hereinafter, the term "network" refers generally to any type of wired or wireless network including, without limitation, data networks (including MANs, PANs, WANs, LANs, WLANs, micronets, piconets, internets, and intranets), satellite networks, cellular networks, and telco networks.

As used hereinafter, the term "administrator" refers generally and without limitation to a supervisory person(s), corporation or business entity, logical software entity, etc. which has the privilege and capability to manage a network, in part or whole. For example, the owner of a home Wi-Fi hotspot may also be the administrator of a private network, whereas the network ISP of the same hotspot may be the administrator of a public network.

Moreover, while the foregoing example is presented in terms of both the owner and the network ISP enjoying administrator privileges for a hotspot, it is further appreciated that such administrator privileges may be further differentiated in terms of capabilities, scope, permissions, etc. For example, the owner may have the ability to override the network ISP's management (in part or whole), or vice versa.

As used hereinafter, the terms "public" and "private" within the context of networks and network use relates generally to a distinction between network access provided by a network ISP and network access limited to a private group of users (e.g., a home Wi-Fi hotspot, enterprise network, etc.). Moreover, it is appreciated that the terms public and private, in the context of networks and network use, generally but do not necessarily refer to a degree of security; for example, public networks may require proper authorization based on a device credential (e.g., stored on a Subscriber Identity Module (SIM)) provided by the network ISP, whereas private networks may impose owner-specific requirements (e.g., password, user name/password, guest access, unrestricted access, etc.).

As used hereinafter, the term "overlapping networks" refers generally to two or more distinct networks which are available (or might be available) for use by a wireless device. Overlapping networks may or may not physically overlap with one another.

"Fast Scan" Operation—

FIG. 1 is a graphical representation of one exemplary overlapping network 100, useful for illustrating one or more embodiments. As shown, the overlapping network is a Wi-Fi network that includes a plurality of Wi-Fi Access Points (APs) 102 which are configured to provide public network access. For example, a network ISP operator may offer roaming access to subscribers under e.g., a contractual business arrangement, on a complimentary basis, etc. It is appreciated that the public network may still implement one or more authentication, authorization, and/or accounting credentials; for example, a network ISP may verify that a device or subscriber has e.g., purchased an appropriate roaming contract, shared a portion of their personal home AP bandwidth in exchange for reciprocal access, etc. Common examples of credentials include without limitation: unique identifiers, user account/passwords, personal identification numbers (PIN), digital certificates, cryptographic elements, etc.

As shown, at least one of the APs 102A is further configured according to an overlapping network mode; specifically, the overlapped AP 102A reserves a first portion of its bandwidth for a first use (e.g., public use), and a second portion of its bandwidth for a second use (e.g., private use). During operation, the overlapped AP identifies a connecting client device, and allows the device to complete authorization procedures with the public network ISP, or alternately complete authorization procedures with the overlapped AP's internal authorization module which is managed by the administrator of the AP. Subsequent to successful authorization, the overlapped AP will add the device to the appropriate pool of other connected devices (either a pool of public client devices or a pool of private client devices). In this manner, the overlapped AP can manage the bandwidth limitations imposed on the public and private pools of devices. For example, the AP may ensure that the private pool of devices has a minimum guaranteed amount of bandwidth (or percentage of available bandwidth), regardless of public device requirements. In other less draconian systems, the AP may impose softer or more flexible bandwidth limitations (e.g., schemes where unused bandwidth may be freely allocated, schemes where public and private use are provisioned according to a weighted fairness, schemes where time-based or other sharing is imposed, etc.)

Moreover, while the foregoing scheme is discussed in the context of public and private pools, it is appreciated that other permutations are readily interchanged. For instance in an alternate embodiment, an enterprise network may provide various gradations of e.g., "private" networks; one such network may have a first private network for e.g., contractors, customers, vendors, etc. and a second private network for employees. Similarly, in certain government applications, a network may have e.g., a first security clearance use network (e.g., "secret"), and a second security clearance use network (e.g., "top secret"). In still other implementations, a first public network offering a first data plan may be provided by a first network ISP, and a second public network offering a second data plan may be provided by a second network ISP.

Referring back to FIG. 1, consider a first prior art "continuous scan" client device 104 and a second prior art "fast scan" client device 106.

The first continuous scan client device 104 performs a comprehensive scan over all channels for any available networks, and has both public network credentials and private network credentials. During operation, the first client device is constantly scanning for an optimal network, and can freely travel between the public network and the private network. Since the first client device can have significantly higher performance when it is connected to the private network, the first client device will preferentially seek out and connect to private networks when available. Unfortunately, continuously scanning for networks consumes significant amounts of power. Moreover, scanning all channels can take a significant amount of time (on the order of several seconds).

In contrast, consider a second fast scan client device 106 which prioritizes a so-called "fast scan" for one or more previously connected networks; if the fast scan fails, then the second client device proceeds with a comprehensive scan. The fast scan scheme of the second client device offers several benefits over the comprehensive scanning procedure of the first client device 104. Specifically, unlike the comprehensive scanning procedure, the fast scan is limited to a very small set of channels, and can be performed quickly. Moreover, it is generally true that the second client device should remain on its previously connected network when possible, so as to reduce network connection overhead signaling. Thus, the fast scan scheme can greatly improve power consumption and device performance, especially when compared to the comprehensive scans of the first client device.

Unfortunately, one drawback of the fast scan procedure is that the second client device will always automatically connect to the public network, even where a better (i.e, higher bandwidth) private network is available. More pointedly, the second client device does not actively search for overlapping networks because the second client device fast scans only the subset of channels which were previously used.

Methods—

Figure 2:
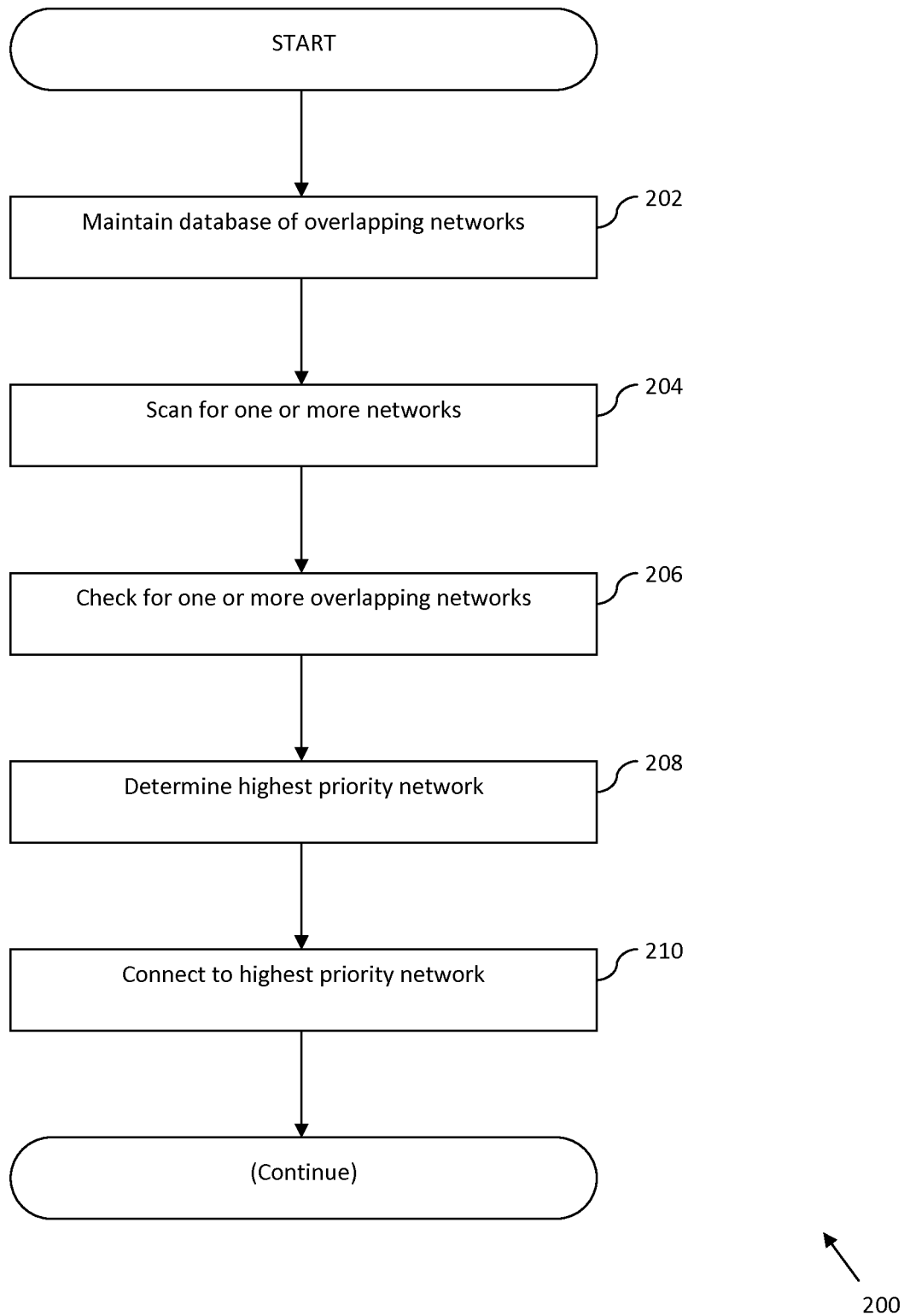
FIG. 2 is a logical flow diagram of one embodiment of a generalized method for prioritized network selection within overlapping networks, in accordance with the present disclosure.

In view of the foregoing scanning techniques, improved methods for prioritizing network selection for overlapping networks according to the present disclosure are now discussed in greater detail. FIG. 2 presents a logical flow diagram of one generalized method 200 for prioritized network selection within overlapping networks. While the following discussion is presented within the context of Wi-Fi networks, it is appreciated that various embodiments are broadly applicable to other wireless networking technologies including, without limitation, cellular networks (e.g., closed service group (CSG) type operation), metropolitan area networks (MANS), personal area networks (PANs), etc.

At step 202 of the method 200, access to a database of overlapping networks is provided to the client device, or is otherwise internally maintained by the client device. In one embodiment, the database is internally stored within the client device, such as in a mass storage device (e.g., memory) thereof. In alternate embodiments, the database is externally stored within a network entity (e.g., a network management device, a so-called "cloud" based storage, etc., or via a third party storage repository such as an Internet server) from which the client device pulls or receives updates (e.g., periodic, aperiodic, event-triggered, requested basis, etc.). In still other embodiments, the database may be stored in media controlled by the user; for example, such user controlled media may include e.g., a syncing application in a home personal computer, within a removable card or other media (e.g., SD Card, USB zip drive, etc.), downloadable software patch (such as could be purchased for a trip abroad, etc.).

In one embodiment, the database includes geographic information. Generally, geographic information may include for instance locations or coordinates of one or more accessible servers, and/or information regarding the available coverage range. For example, in one exemplary embodiment, the geographic information may be based on a coordinate system such as latitude and longitude, Global Positioning System (GPS) data, Global Navigation Satellite System (GLONASS) data, a database of AP locations, etc. Still other types of geographic information may be based on e.g., relational data, such as based on servers which neighbor other servers, etc.

Still other types of useful information may relate to various times and/or other business considerations. Common examples of such information include so-called "delta" changes to coverage that may occur throughout the day to e.g., facilitate consumer-driven load balancing. For instance, a network ISP may opt to improve coverage and/or monetary rates during off-peak hours, so as to maximize overall network utilization. In still other embodiments, a network ISP may provide coverage for limited engagement situations, such as sporting events, etc. Hence, the present disclosure contemplates that coverage and/or capabilities may be varied as a function of time or other parameters.

In still other embodiments, the database includes authentication and/or authorization information. Typically, a subscriber device will include multiple authentication and/or authorization credentials for verifying its identity to various parties e.g., a network ISP, a private third party operator, a home network, etc. Common examples of such credentials include e.g., unique identifiers, passwords, encryption protocols, encryption keys (e.g., asymmetric and/or symmetric encryption keys), digital certificates, etc.

Those of ordinary skill in the related arts will recognize that the maintenance and upkeep of a database can be performed concurrent to other operations of the method 200. Specifically, while database upkeep is desirable to ensure that the client device has recent information for optimizing device behavior, "stale" information commonly results in poor performance but typically does not result in failure. Thus, various implementations may additionally perform database maintenance as a function of performance requirements versus the additional processing burden and complexity of more frequent database upkeep. In some variants, a processor may update the database e.g., periodically, on an as-needed basis, when otherwise idle, when performance deteriorates below acceptable thresholds, etc.

In still other variants, the client device may determine the available one or more networks based on so-called "out-of-band" information i.e., via sources other than the scanning technology. For example, a Wi-Fi client device may be appraised of other Wi-Fi networks based on a Bluetooth based discovery service. In other instances, the user may provide available network information via a graphical user interface (GUI). Various other schemes will be readily appreciated by those of ordinary skill, given the contents of the present disclosure.

At step 204, the client device performs a scan for one or more networks. In one embodiment, the scan includes a search for server presence over one or more network resources. Within the context of Wi-Fi, the Access Point (AP) broadcasts a beacon signal which the client device can decode. In other technologies, the client device may e.g., determine a received signal strength (e.g., RSSI) measurement for a particular transmission channel, decode a broadcasted message, etc. Those of ordinary skill in the related arts will readily recognize that presence detection is commonly implemented by way of e.g., a broadcasted beacon, a broadcasted pilot channel, probe/response protocols, etc.

Common examples of network resources which can be scanned include frequency bands or subcarriers, time slots, spreading codes, etc. For example, the client may tune to a frequency band and "sniff" for any data transmissions; where a transmission is detected, the device can identify if the transmission is a beacon, etc. If no data transmissions are found, then the client can attempt to sniff another frequency band. In other examples, the client may tune in at a broadcast control channel time slot, or configure itself to demodulate a pilot code sequence, etc. to determine if a server (e.g., AP) is present.

In some embodiments, the scan may be limited to a subset of all possible network resources. For example, in some variants, the subset used as the basis for the scan may be based on e.g., historical usage, last usage, regulatory limitations, user input, or network input. In one exemplary implementation, a wireless client device only scans for its most recently connected wireless network (or one or more of the most recently n connected networks). The wireless client device may additionally scan for one or more preferred networks, where the preferred networks may be identified by e.g., the network ISP, the user of the client device (e.g., via an input entered by the user or network operator when configuring the client device), etc.

In some variants, the subset of network resources which are scanned may be a fixed number (e.g., only the one (1) or two (2) most recent or otherwise prioritized networks, etc.). In alternate variants, the subset may be dynamically chosen based on e.g., power, performance, etc. For example, in some embodiments, the device may reduce its scanning subset to reduce power consumption or alternately increase its scanning subset to improve its performance, and/or select the subset irrespective of temporal proximity or other such factors.

As previously indicated, certain technologies with which the various embodiments may be used can be based on device-initiated probes rather than scanning. Accordingly, those of ordinary skill in the related arts will readily recognize that probes can be adjusted according to network resources (e.g., frequency subcarrier, time slot, and/or spreading code, etc.). Similarly, probing devices may be similarly limited to a subset of network resources based on fixed and/or dynamic considerations such as e.g., power, performance, etc.

At step 206 of the method 200, when a network is identified, the device checks for one or more overlapping networks based on the maintained database. Specifically, the client device determines if, based on the identified network and/or its current location, one or more potential overlapping networks are nearby and/or likely to be functional. In one exemplary embodiment, the client device scans or probes for any likely one or more overlapping networks. For example, if the client device determines that it is within close proximity to its home private network (which has, in this example, significantly higher performance capabilities than its currently connected public network) or other network of choice, then the client device can perform a scan to check for the presence of the home private network.

In some variants, the proximity may be static or dynamically configurable based on performance and/or operational requirements. Larger proximity values can result in better performance since the device scans for a longer duration; however, smaller proximity values can result in better power consumption. For example, in one fixed embodiment, the device may begin checking for overlapping networks when it is within 250 m (meters) of a potential overlapping network. In a dynamic scheme, the device may vary its distance from a minimum range (e.g., 50 m) to a maximum range (e.g., 300 m) based on its current battery reserves, and/or applications (based on e.g., Quality of Service (QoS) requirements).

In some embodiments, the check for overlapping networks is performed for a fixed number of times. For example, the client device may attempt to check for overlapping networks several (e.g., a prescribed number of) times, and if the overlapping network is not available, then the device connects to the discovered network. By limiting the number of check iterations, the client device can reduce unnecessary scans. This "fixed" number of times may also be dynamically altered based on operation or other factors such as e.g., remaining battery power of the client, user configuration, etc. For example, if the remaining fraction of battery power is high, the number of retries might be set higher than it would if the remaining fraction were lower.

Additionally, the interval between retry attempts can be dynamically altered based on such operational or other considerations, for example, the temporal spacing between the first and second retry, and the second and third retry, may be set longer where more battery power is available. Moreover, the spacing need not be equal. For example, the temporal spacing between the first and second retry may be longer than the second and third retry, where the likelihood of a successful connection will diminish with an increasing number of retries (repetitively waiting a comparatively long period can be mitigated by allowing the client to more rapidly "move on" to other network choices, thereby improving user experience). In an alternate case, the temporal spacing between the first and second retry may be shorter than the second and third retry, where the likelihood of a successful connection changes or increases over time (e.g., if the client device is moving toward a preferred network).

In still other embodiments, the client device may connect to the currently discovered network, and concurrently perform checks for an overlapping network. In some variants, the device only performs a limited number of checks for an overlapping network; alternately, the device may perform continuous checking until another network is found. For instance, the client device may attempt to check for overlapping networks on a regular interval. Shorter intervals result in faster discovery, but also consume more power and may interrupt other processing tasks (and potentially degrade user experience). In other embodiments, the client device may attempt to check for overlapping networks only during idle processes (e.g., when no other tasks are necessary, etc.). In related variants, the client device can consider constraints such as e.g., remaining battery power, performance, etc. in its scheduling and/or decision on whether to check for overlapping networks.

At step 208 of the method 200, when an overlapping network is available, the client device determines the highest priority network (or a hierarchy of priorities; see the method

250 of FIG. 2*a*, described subsequently hereinafter). In one simple scenario, an overlapping network may offer a first public network, or a second home private network; the client device can select the second home private network, as the private network is likely to offer better service, performance, etc. In more complex scenarios, the client device may have to select from multiple different networks (e.g., where multiple networks (private, public, etc.) have different characteristic qualities and/or costs associated therewith). The aforementioned complexity can be either automatically handled (via e.g., an intelligent algorithm, one or more predetermined selection rules, etc.), or may require manual input via e.g., a GUI, etc.

In one embodiment, the prioritization scheme is based on a fixed or predetermined scheme. Common examples of fixed schemes include, without limitation, look-up tables (LUT), prioritized lists, fixed weighting schemes, etc. Generally, fixed schemes rely on a preloaded or periodically updated data structure (such as a LUT, etc.). For example, a Wi-Fi client device may have a list of prioritized BSSIDs in an ascending list. To determine the highest priority network, the client device determines the ranked order of the BSSIDs, and selects the highest priority BSSID.

Consistent with certain variants, the prioritization scheme is determined dynamically based on network input, and/or client input. For example in one exemplary scenario, the client device may include determinations as to the client's historic preference for a particular network, prevailing network conditions (e.g., current amount of network usage), and/or currently running application requirements or other operational considerations of the client device. In one such dynamic scheme, the LUT may have a list of values for each BSSID which when tabulated against other values (such as cost of use, current network performance, performance requirements, etc.) results in an overall score. The BSSID which has the highest score is selected as the "highest priority" BSSID.

In some embodiments, the prioritization scheme is determined based on historical input. Common examples of historical data include, without limitation, user selections, network performance, latency, throughput, power consumption, etc. For example, a client device may record previous user selections of networks. If the user consistently selects a first network over a second network, then the client device may automatically default to the first network. Similarly, if a given network routinely requires higher power consumption (such as due to the client only being able to access an AP at the fringe of its range capability), then the device may opt for lower-power alternatives, especially if client battery power is an issue.

In some embodiments, where multiple overlapping networks with respective cell IDs are detected, and multiple preferred Wi-Fi networks are detected, the device can resort to continuous scanning to ensure that the device is always connected to the optimal network. In still other alternative embodiments, the device may continuously or semi-frequently rank the multiple possible preferred networks so as to maximize performance.

Lastly, at step 210 of the method 200, the client device connects to the highest priority network. Once connected, the client device can register to the network, transact data, etc.

Exemplary Apparatus—

Figure 3:
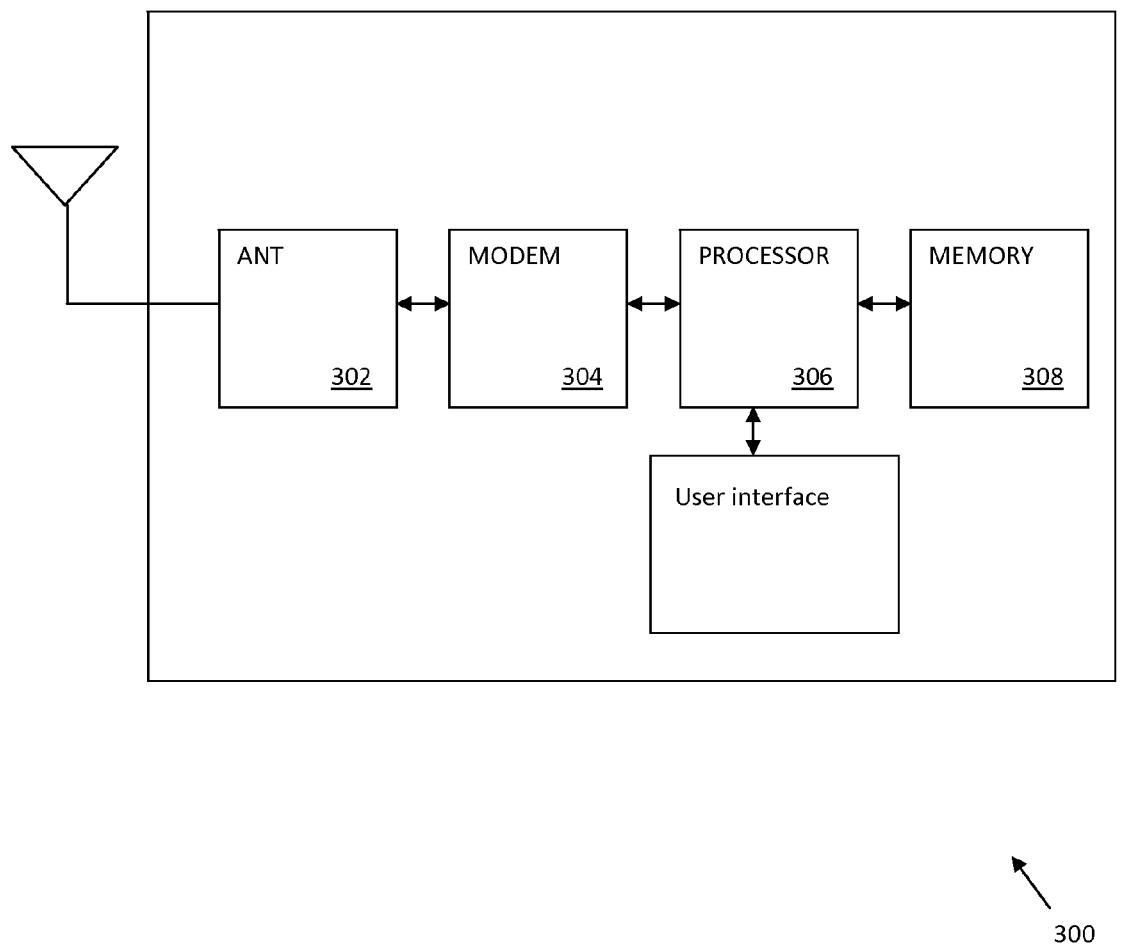
FIG. 3 is a functional block diagram of one exemplary embodiment of a client device configured to prioritize network selection within overlapping networks according to the present disclosure.

Referring now to FIG. 3, a functional block diagram of one exemplary client device 300 configured to prioritize network selection within overlapping networks is illustrated. While one specific device configuration and layout is shown and discussed herein, it is recognized that many other configurations may be readily implemented by one of ordinary skill given the present disclosure, the apparatus 300 of FIG. 3 being merely illustrative of the broader principles of the present disclosure.

The apparatus 300 of FIG. 3 includes one or more antennas 302, one or more modems 304, a processing subsystem 306, and a non-transitory computer-readable memory subsystem 308. The device may in certain configurations include for example a WLAN and/or WMAN interface, as well as a cellular interface, such as would be found on a smartphone or tablet computer.

The processing subsystem 306 includes one or more of central processing units (CPU) or digital processors, such as a microprocessor, digital signal processor, field-programmable gate array, RISC core, or plurality of processing components mounted on one or more substrates. The baseband processing subsystem is coupled to non-transitory computer-readable memory 308, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

The processing subsystem 306 is adapted to receive one or more data streams from the one or more modems 304 and associated antennas 302. In one exemplary embodiment, the one or more modems are based on the IEEE 802.11 data networking standard. Other common wireless technologies include without limitation: cellular technologies (such as: UMTS, WCDMA, GSM, CDMA2000, TD-SCDMA, TD-LTE, LTE, etc.), WMAN such as WiMAX, personal area network (PAN) technologies (e.g., Bluetooth, Zigbee, wireless USB, UWB, etc.), etc.

In one embodiment, the processing subsystem 306 may further include an applications processor and a baseband processor. In one common variant, the application processor is adapted to control overall operation of the device including, for example: multimedia processing, operating system controls, program management, baseband processor configuration and control, etc. The baseband processor is configured to manage the modem and/or antenna operation.

In one exemplary implementation of the apparatus 300, the memory subsystem is configured to store an internal database of one or more overlapping networks. In one variant, the internal database includes geographic information for one or more accessible servers and/or information regarding the coverage range. For example, the geographic information may be based on a coordinate system such as latitude and longitude, Global Positioning System (GPS) data, known Access Point (AP) locations, etc. as previously indicated, the data being stored in the memory of the apparatus for easy access during e.g., the prioritization process.

In addition, the database may include other types of useful information that relate to various times and/or other business considerations. Common examples of such information include changes to coverage that may occur throughout the day to e.g., facilitate consumer driven load balancing. In still other embodiments, the database includes authentication and/or authorization information, such as e.g., unique identifiers, passwords, encryption protocols, encryption keys (e.g., symmetric and/or asymmetric encryption keys), digital certificates, etc.

In one exemplary embodiment, the one or more modems 302 are further configured to perform a scan for one or more networks. Within the context of Wi-Fi, the one or more modems are configured to identify the presence of one or more networks on the basis of a broadcast beacon message. A beacon message is a short packet periodically broadcast by a Wi-Fi AP. The beacon message contains, without limitation: timing, identity, and capabilities for the AP. In alternate implementations, the client device can transmit a PROBE_REQUEST packet to a previously identified Wi-Fi AP. If the AP receives a PROBE_REQUEST packet, it will respond with a PROBE_RESPONSE packet to acknowledge its existence.

The one or more modems 304 are also configured in certain implementations to optimize performance by limiting scanning activity where possible, so as to e.g., reduce power usage and improve user experience. Specifically, the one or more modems are configured to limit scans to only a subset of all possible network resources based on e.g., historical usage, last usage, regulatory limitations, user input, network input, etc., as previously discussed herein. In some variants, the subset of network resources which are scanned may be a fixed number (e.g., only the one (1) or two (2) most recent networks, etc.). In alternate variants, the subset may be dynamically chosen based on e.g., power, performance, etc. For example, in some embodiments, the device may reduce its scanning subset to reduce power consumption or alternately increase its scanning subset to improve its performance. Similarly, probing embodiments may be limited to a subset of network resources based on fixed and/or dynamic considerations.

Figure 2A:
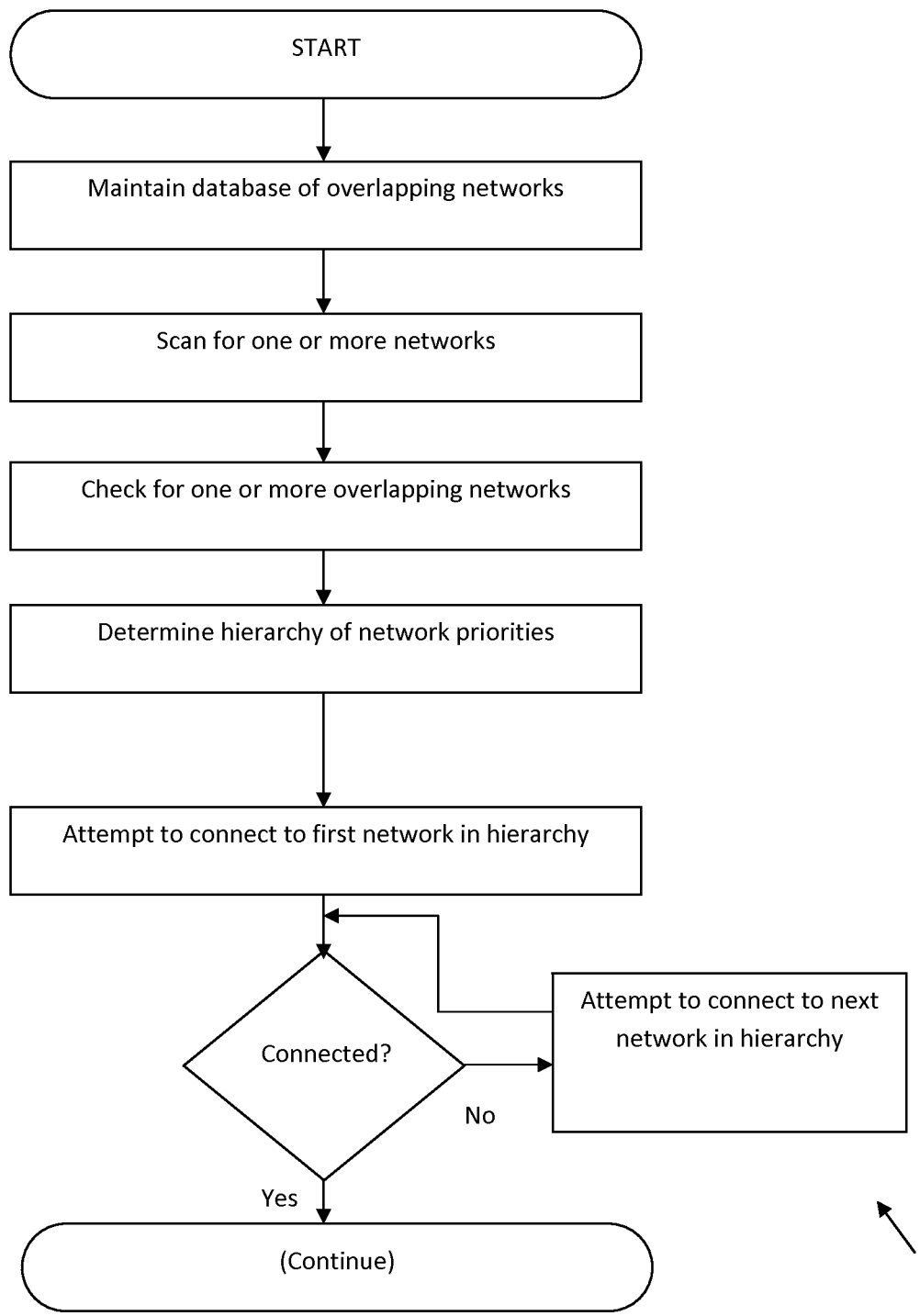
FIG. 2a is a logical flow diagram of another embodiment of the method for prioritized network selection within overlapping networks in accordance with the present disclosure.

The client device is further configured to determine the highest priority network (or a hierarchy, as shown in FIG. 2a) based on its database and/or one network that is accessible to it over one of its wireless interfaces. In one variant, the client device includes one or more of a look-up table (LUT), prioritized lists, fixed weighting schemes, etc. for use with a fixed prioritization scheme. In other variants, the client device receives current information from one or more of e.g., network input, device considerations, and client input. For example, in one exemplary scenario, the client device may include determinations as to the client's historic preference for a particular network, prevailing network conditions (e.g., current amount of network usage), and/or currently running application requirements.

Example Operation—

Figure 4:
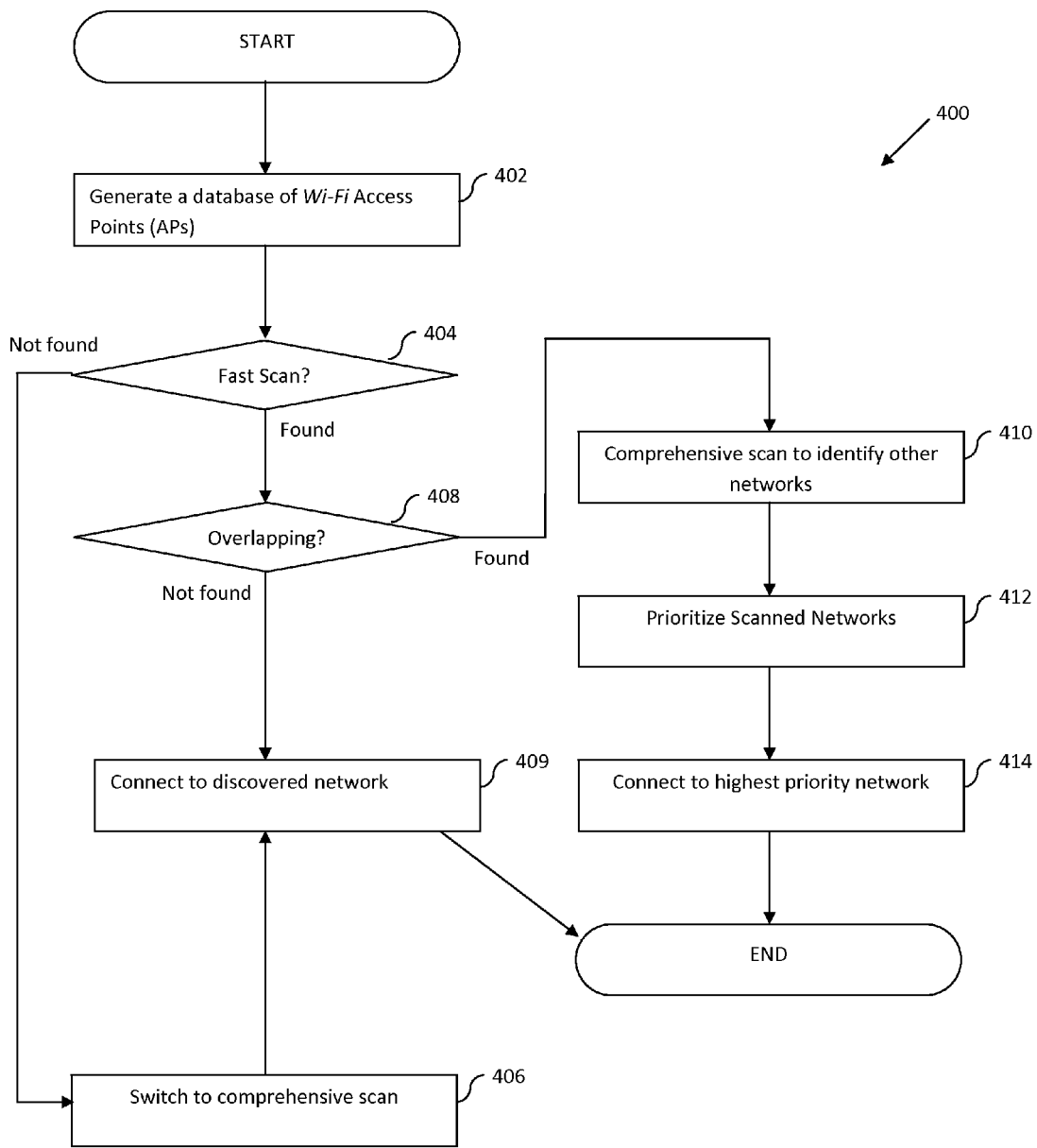
FIG. 4 is one logical flow diagram of one exemplary implementation of a method for prioritized network selection within overlapping networks according to the present disclosure.

Referring now to FIG. 4, a logical flow diagram of one exemplary embodiment of a method 400 for prioritized network selection within overlapping networks is illustrated.

At step 402 of the method 400, an exemplary Wi-Fi client device generates a database of Wi-Fi Access Points (APs). In one exemplary embodiment, the database includes so-called "geo-tags" for each AP that the client device has connected to. Geo-tags contain e.g., location information associated with each basic service set identifier (BSSID).

In one variant, the Wi-Fi client device additionally categorizes BSSIDs within maximal proximity as overlapping networks. For example, the client device may be configured to categorize any two or more BSSIDs within ~250 meters (m) as an overlapping network. It will be appreciated that while a specific distance is set forth in the example, this may also be dynamically determined and/or varied in certain implementations, such as based on externally provided data (e.g., indicating a maximum usable range of a given BSSID), measurements or sensing performed by the client device (e.g., RSSI, BER, etc.), or data from other "peer" devices that have or are currently associated with the given BSSID.

During normal operation, the Wi-Fi client device performs fast scans to quickly locate one or more preferred networks if available (step 404). If the fast scan does not succeed, then the client device switches to a comprehensive scan (step 406). In this exemplary scenario, the preferred network may be a public network that the client device was most recently connected to. Once a network is found, the device can connect to the discovered network (409).

When the client device discovers a preferred network, the client device determines if the discovered network is an overlapping network (step 408). For example, the client device may identify the presence of an overlapping network based on geographic proximity and the discovered network's BSSID. If the discovered network is not an overlapping network, then the device can connect to the discovered network (409).

When the discovered network is an overlapping network, then the client device performs a comprehensive scan to identify all available networks (step 410). Consider a discovered first network (e.g., a public network), provided by an AP which also provides a second network (e.g., a private network). The client device will have discovered the public network (as the public network was the most recently used network), but the client device will (based on its internal database) recognize that an overlapping network may be available, and thus search for the likely private network.

At step 412, once the client device has identified all available networks, then the device applies a prioritization scheme to determine the highest priority network (see Prioritization Schemes discussed below).

In some optional variants, if a higher priority network is not discovered during the comprehensive channel scan, then the device connects to the discovered network, but continues to scan for higher priority overlapping networks.

At step 414, the client device connects to the highest priority network.

Prioritization Schemes—

While various schemes for prioritizing one or more networks are disclosed hereinafter, it should be appreciated that the following discussion is merely illustrative. Those of ordinary skill in the related arts may readily interchange other prioritization schemes, in light of the contents of the present disclosure.

In one exemplary embodiment, a wireless client device prioritizes one or more discovered networks according to a static prioritization scheme. For example, the client device may be programmed or pre-programmed with a relative priority of overlapping networks (e.g., a "bundle" determined by an ISP/Carrier). In some variants, the user may be allowed to configure the relative priorities of overlapping networks.

In other embodiments, the wireless client device may prioritize one or more discovered networks according to a dynamic prioritization scheme. For example, in one such variant, a dynamic scheme is configured to adapt to historic usage patterns. For example, if the client device is connected to a first network (e.g., public hotspot) and the user selects a second network (e.g., a private network), then the device can store this information to "learn" the user's selection preferences.

In yet other embodiments, other indicia or parameters can be used as the basis for prioritization, whether in place of or in conjunction with the foregoing. For instance, in one variant, the various BSSIDs are ranked based on historic usage patterns (e.g., frequency of use and/or temporal proximity to last connection). Then, other operational considerations are overlaid onto this ranking; i.e., rate of power consumption, latency, available bandwidth, etc. are considered, and the various rankings weighted accordingly. Hence, it is contemplated that implementations where more sophisticated, multivariate weighting or scoring is utilized in order to select the order in which BSSIDs are accessed (or attempted).

It will be recognized that while certain embodiments are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure as disclosed and claimed herein.

While the above detailed description has shown, described, and pointed out novel features as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the principles of the present disclosure. This description is in no way meant to be limiting, but rather should be taken as illustrative of the general principles of the disclosure. The scope of the disclosure should be determined with reference to the claims.

What is claimed is:

1. A method for prioritized network selection by a client device, the method comprising:
   at the client device:
      generating a database of Wi-Fi Access Points (APs);
      performing a limited scan to search for discovered networks, the limited scan comprising scanning less than all available channels;
      when no discovered network is found during the limited scan, perform a first comprehensive scan, the first comprehensive scan comprising scanning for all available networks; and
      when a discovered network is found during the limited scan:
         determining whether the discovered network is an overlapping network of a plurality of overlapping networks based at least in part on the database of Wi-Fi APs;
         when the discovered network is not an overlapping network, connecting to the discovered network; and
         when the discovered network is an overlapping network:
            performing a second comprehensive scan to search for additional networks, the second comprehensive scan comprising scanning for all available networks;
            prioritizing any additionally discovered networks and the discovered network; and
            connecting to a highest priority discovered network.

2. The method of claim 1, wherein generating the database of Wi-Fi APs comprises recording a location of each Wi-Fi AP with which the client device connects.

3. The method of claim 2, wherein generating the database of Wi-Fi APs further comprises categorizing a first Wi-Fi AP as one overlapping network of the plurality of overlapping networks when the first Wi-Fi AP is located within a determined proximity to a second Wi-Fi AP.

4. The method of claim 3, wherein the determined proximity is based on a range of the first Wi-Fi AP.

5. The method of claim 2, wherein generating the database of Wi-Fi APs further comprises categorizing a first Wi-Fi AP as one overlapping network of the plurality of overlapping networks when the first Wi-Fi AP provides connections to multiple networks.

6. A method for prioritizing network selection by a wireless device, the method comprising:
   at the wireless device:
      performing a limited search over a subset of less than all possible network resources to identify one or more networks;
      when a first network is found during the limited search:
         checking an availability of one or more overlapping networks based on a database of overlapping networks and the first network; and
         when one or more overlapping networks is available:
            performing a comprehensive search over all possible network resources to identify any additional networks;
            determining a prioritized network based on the first network, the one or more overlapping network, and any identified additional networks; and
            attempting to connect to the prioritized network; and
      when no network is found during the limited search:
         performing the comprehensive search over all possible network resources to identify a network with which to connect.

7. The method of claim 6, wherein the wireless device performs the limited search over a set of networks to which the wireless device most recently connected.

8. The method of claim 6, wherein the wireless device performs the limited search based on historical usage.

9. The method of claim 6, wherein the one or more overlapping networks comprises at least one private network.

10. The method of claim 6, wherein the checking the availability of one or more overlapping networks comprises scanning for the one or more overlapping networks a fixed number of times.

11. The method of claim 6, wherein the checking the availability of one or more overlapping networks comprises scanning for the one or more overlapping networks a dynamic number of iterations based on a remaining battery metric.

12. The method of claim 6, further comprising:
    at the wireless device:
       when the attempting to connect to the prioritized network fails, attempting to connect to a next highest priority network.

13. An apparatus comprising:
    a network interface;
    a processor; and
    a non-transitory computer readable apparatus having a storage medium with at least one computer program stored thereon, the at least one computer program configured to, when executed on the processor, cause the apparatus to:
       attempt to identify, via the network interface, at least a first network by performing a limited search over a subset of less than all possible network resources;
       when at least the first network is identified during the limited search:
          check an availability of one or more overlapping networks based on a database of such networks and the identified first network; and
          when one or more overlapping networks is available:
             determine a prioritized network based on the identified first network and any additional networks identified by a comprehensive search over all possible network resources; and attempting to connect to the prioritized network; and when no network is identified during the limited search:
performing the comprehensive search over all possible network resources to identify a network with which to connect.

14. The apparatus of claim 13, wherein the prioritized network is determined dynamically at least in part on historical preference.

15. The apparatus of claim 13, wherein the prioritized network is determined dynamically at least in part on prevailing network conditions.

16. The apparatus of claim 13, wherein the prioritized network is determined dynamically at least in part on a rate of power consumption by the apparatus.

17. The apparatus of claim 13, wherein the prioritized network is determined at least in part, on whether an overlapping network of the one or more overlapping networks is private.

18. The apparatus of claim 13, wherein the at least one computer program is further configured to, when executed on the processor, cause the apparatus to periodically update the database.

19. The apparatus of claim 18, wherein the database is updated based on information obtained via a network-based database.

20. The apparatus of claim 13, wherein the apparatus performs the limited search over a positive integer number of preferred networks.

* * * * *